Nov. 26, 1935.  G. A. LYON  2,022,129
TIRE COVER
Filed Aug. 19, 1933
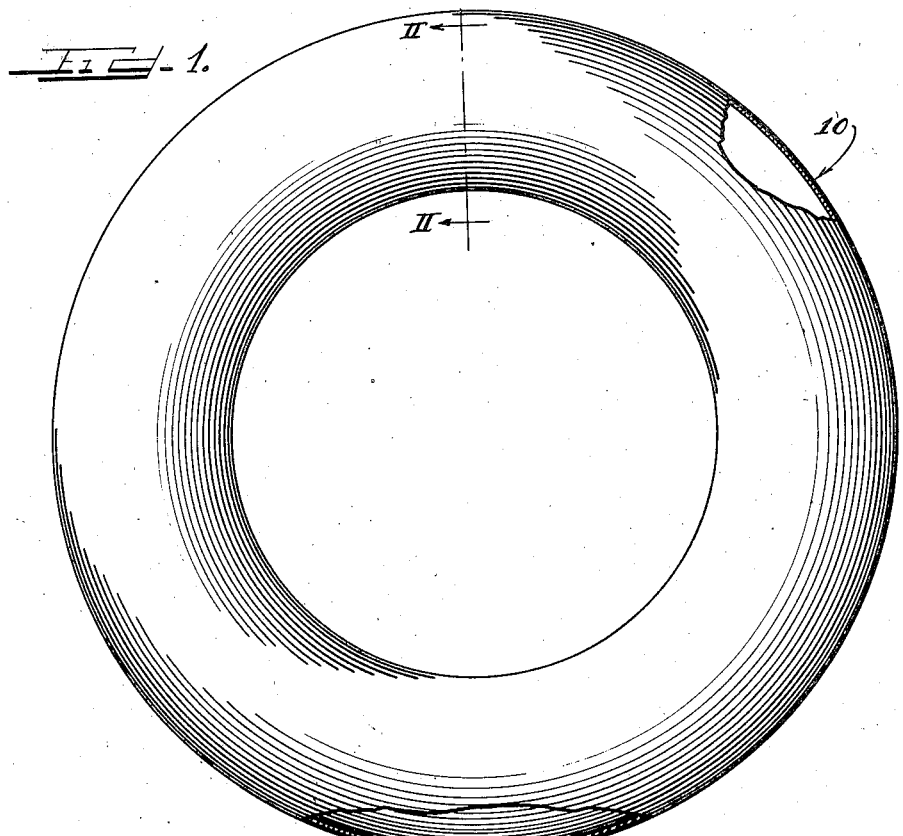
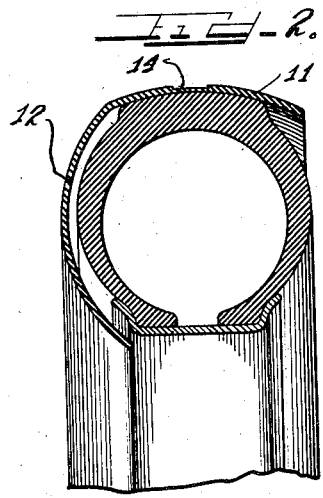
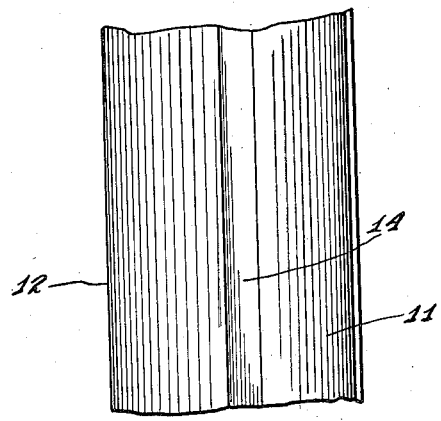
George Albert Lyon.

Patented Nov. 26, 1935

2,022,129

UNITED STATES PATENT OFFICE 2,022,129

TIRE COVER

George Albert Lyon, Detroit, Mich., assignor to Lyon Incorporated, Detroit, Mich., a corporation of Delaware Application August 19, 1933, Serial No. 685,836

2 Claims. (Cl. 150—54)

This invention relates to tire covers and more particularly to a protective cover for a spare tire on an automobile vehicle.

The subject matter of the present application relates to that disclosed in my copending application Serial 526,882, filed April 1, 1931 which on August 22, 1933, issued into Letters Patent No. 1,924,086.

An object of this invention is to provide an improved tire cover made from a material adapted to aid in preserving the shape of the cover, and yet at the same time being sufficiently flexible that it may be stretched over the tire into a resilient cover retaining cooperation with the tire.

In accordance with the general features of this invention there is provided an arcuate tire cover including a rim portion for covering the outer periphery of the tire and a side portion for disposition over the outer side wall of the tire, these portions having a curved cross sectional shape so as to conform with the curved transverse contour of the tire and being made of a material such as molded rubber of sufficient flexibility that the rim portion of the cover may be resiliently stretched over the tire tread into cover retaining cooperation with the tire.

Other objects and features of this invention will more fully appear from the following detailed description taken in connection with the accompanying drawing which illustrates a single embodiment thereof and in which Figure 1 is a front view of my novel improved tire cover partly broken away to show the construction of the same;

Figure 2 is a fragmentary cross-sectional view taken on substantially the line II—II of Figure 1 looking in the direction indicated by the arrows, and Figure 3 is a fragmentary end view of the cover showing the circumferential groove in the outer surface of the tread covering portion of the cover.

The tire cover illustrated in Figure 1 is designated generally by the reference character 10 and comprises a rim portion 11 adapted to cover the outer periphery of the tire and a side portion 12 for disposition over the outer side wall of the spare tire to which the cover is applied. These two parts are of arcuate or circular shape and are so formed that the cover may be shoved axially over and onto the spare tire. This cover may be made of any suitable resilient material such for example as molded rubber. The material however should be of sufficient flexibility so that the rim 11 may be stretched over the outer periphery or tread of the tire into resilient cover retaining cooperation with the rear part of the tire. In other words, the rear margin of the tread covering portion or rim 11 of the cover is adapted to extend inwardly of the outermost periphery of the tire and is disposed to the rear of median plane of the tire so as to resiliently grip the tire and thus retain the cover in proper tire protecting position on the spare tire.

Reference to Figure 2 readily reveals that both the rim and side portions 11 and 12 respectively are transversely arcuate to conform with the transverse curvature of the tread and outer side walls of the tire. It will of course be appreciated that by making this cover of molded rubber as distinguished from a pliable fabric, the cover is necessarily inherently resilient. Also, the material of the cover is in itself capable of aiding in preserving the desired circumferential and cross-sectional shape of the cover.

The innermost margin of the side covering portion 12 extends inwardly of the tire so as to closely conform with the outer contour of the side wall of the tire.

On the other hand, the rear margin of the tread covering or rim portion 11 of the cover, as noted herein above, extends inwardly of the outermost periphery of the tire to the rear of the median plane of the tire for retaining the cover in proper tire protecting position on the tire.

In applying this cover to the tire, the tread portion is progressively stretched over the tread of the tire so as to bring its rear margin in retaining cooperation with the rear of the tire.

It should be noted that the rim portion of the cover at the median plane of the tire is provided with a circumferential groove 14 which is adapted to receive a cover clamping or contracting band if such a band is desired. If no contracting band is employed, then this circumferential groove 14 serves to ornament the rim portion of the cover.

Now, I desire it understood that although I have illustrated and described in detail the preferred embodiment of this invention, the invention is not to be thus limited but only in so far as defined by the scope and spirit of the appended claims.

I claim as my invention:

1. A unitary automobile spare tire cover including an arcuate tire side wall covering portion and an arcuate tread covering portion made of elastic material such as rubber, and including an inturned rear marginal edge adapted to be stretched over the outermost periphery of the tire during the process of applying the cover to the tire and thereafter to extend inwardly of the outermost periphery of the tire and to the rear of the median plane of the tire for cover retaining cooperation with the tire, said side and tread covering portions each being molded to a given transversely curved shape and the curvatures each having a different radius from that of the other after the cover is applied to the tire.

2. A unitary automobile spare tire cover including an arcuate tire side wall covering portion and an arcuate tread covering portion made of elastic material such as rubber, and including an inturned rear marginal edge adapted to be stretched over the outermost periphery of the tire during the process of applying the cover to the tire and thereafter to extend inwardly of the outermost periphery of the tire and to the rear of the median plane of the tire for cover retaining cooperation with the tire, said side and tread covering portions each being molded to a given transversely curved shape and extending circumferentially about more than 180° of the tire.

GEORGE ALBERT LYON.